United States Patent
Hertsgaard et al.

(10) Patent No.: US 9,638,085 B2
(45) Date of Patent: May 2, 2017

(54) DIESEL EXHAUST FLUID TANK FOR AN OFF-ROAD VEHICLE

(71) Applicant: CNH America LLC, New Holland, PA (US)

(72) Inventors: Timothy Ralph Hertsgaard, Fargo, ND (US); Jason Keith Novacek, West Fargo, ND (US); David Donald Blomberg, Dent, MN (US); John Thomas Rasset, Barnesville, MN (US); Erik Andrew Larson, Fargo, ND (US); Paul Eugene Wibbels, West Fargo, ND (US); Daniel LaRoy Hinz, Fargo, ND (US); Jay Michael Larson, Fargo, ND (US); David Larry Tveito, West Fargo, ND (US); David Edward Susag, Fargo, ND (US); Russell Victor Stoltman, Argusville, ND (US); Chad Alry Bautz, Fargo, ND (US); Nathaniel James Keller, Fargo, ND (US); David Sheldon Booth, Phoenix, AZ (US)

(73) Assignee: CNH Industrial America LLC, New Holland, PA (US)

(*) Notice: Subject to any disclaimer, the term of this patent is extended or adjusted under 35 U.S.C. 154(b) by 643 days.

(21) Appl. No.: 13/744,576

(22) Filed: Jan. 18, 2013

(65) Prior Publication Data
US 2014/0202142 A1    Jul. 24, 2014

(51) Int. Cl.
*B65D 88/12* (2006.01)
*F01N 3/28* (2006.01)
(Continued)

(52) U.S. Cl.
CPC ............ *F01N 3/2896* (2013.01); *B60K 13/04* (2013.01); *B60R 16/08* (2013.01); *F01N 3/2066* (2013.01);
(Continued)

(58) Field of Classification Search
CPC ................. B60R 16/08; F01N 13/1861; B29C 45/14262; B60K 15/03177; B60K 15/03; B62D 33/00
(Continued)

(56) References Cited

U.S. PATENT DOCUMENTS

| 4,227,239 A | 10/1980 | Boyer et al. |
| 4,357,293 A * | 11/1982 | Williamson, Jr. ...... B29C 33/14 264/275 |

(Continued)

FOREIGN PATENT DOCUMENTS

| EP | 1384628 A2 | 1/2004 |
| JP | 2011131730 | 7/2011 |

(Continued)

OTHER PUBLICATIONS

European Search Report for European Application No. 14151547.8 dated Mar. 19, 2014 (5 pages).

*Primary Examiner* — Jessica Cahill
*Assistant Examiner* — Angelisa L Hicks
(74) *Attorney, Agent, or Firm* — Rickard K. DeMille; Rebecca L. Henkel

(57) ABSTRACT

A diesel exhaust fluid (DEF) tank for an off-road vehicle including a first conduit channel molded into an exterior surface of the DEF tank, at a first depth, in which the first conduit channel is configured to guide a first conduit along the exterior surface of the DEF tank. The DEF tank further including a second conduit channel molded into the exterior surface of the DEF tank at a second depth, different than the first depth, in which the second conduit channel is configured to guide a second conduit, and the first depth and the second depth are selected to create a vertical gap between the first conduit and the second conduit at an intersection of the conduits.

15 Claims, 14 Drawing Sheets

(51) Int. Cl.
  *F01N 3/20* (2006.01)
  *F01N 13/18* (2010.01)
  *B60R 16/08* (2006.01)
  *B60K 13/04* (2006.01)

(52) U.S. Cl.
  CPC ..... *F01N 13/1861* (2013.01); *F01N 13/1866* (2013.01); *B60Y 2200/41* (2013.01); *F01N 2590/08* (2013.01); *F01N 2610/02* (2013.01); *F01N 2610/1406* (2013.01); *F01N 2610/1413* (2013.01); *Y02T 10/24* (2013.01)

(58) Field of Classification Search
  USPC ............ 220/208, 669, 674, 675, 562; 280/830–839; 137/560
  See application file for complete search history.

(56) References Cited

U.S. PATENT DOCUMENTS

| | | | | |
|---|---|---|---|---|
| 4,708,170 | A * | 11/1987 | Bailey | B60K 15/077 137/574 |
| 5,338,163 | A * | 8/1994 | Frank | B60R 16/08 123/497 |
| 5,606,150 | A | 2/1997 | Radliff et al. | |
| 6,027,679 | A | 2/2000 | O'Brien et al. | |
| 6,049,040 | A | 4/2000 | Biles et al. | |
| 6,086,145 | A | 7/2000 | Wandyez | |
| 6,092,854 | A | 7/2000 | Campbell | |
| 6,109,310 | A * | 8/2000 | Peotter | B60K 15/03504 141/59 |
| 6,142,556 | A | 11/2000 | Tanaka et al. | |
| 6,394,538 | B1 | 5/2002 | Murdock | |
| 6,688,679 | B2 | 2/2004 | Droulez | |
| 7,695,056 | B2 | 4/2010 | Hanson, Jr. et al. | |
| 7,753,545 | B2 | 7/2010 | Groover | |
| 7,877,863 | B2 | 2/2011 | Davidson | |
| 2006/0151505 | A1 * | 7/2006 | Kobayashi | B29C 45/14262 220/562 |
| 2007/0209631 | A1 * | 9/2007 | Campenon | B60K 15/03177 123/198 R |
| 2007/0233360 | A1 | 10/2007 | Hill et al. | |
| 2009/0242312 | A1 | 10/2009 | Oshima et al. | |
| 2011/0220644 | A1 * | 9/2011 | Yager | B60K 15/04 220/86.1 |
| 2011/0271754 | A1 * | 11/2011 | Ross, Jr. | G01F 23/74 73/295 |

FOREIGN PATENT DOCUMENTS

| | | |
|---|---|---|
| JP | 2011132890 | 7/2011 |
| WO | 2012120720 | 9/2012 |

\* cited by examiner

DIESEL EXHAUST FLUID TANK FOR AN OFF-ROAD VEHICLE

BACKGROUND

The present disclosure relates generally to off-road vehicles with diesel engines, and more particularly, a diesel exhaust fluid tank for an off-road vehicle.

Certain off-road vehicles are powered by diesel engines and produce exhaust gas. The exhaust gas may include undesirable byproducts, such as nitrogen oxides (NOx), carbon monoxide, and particulate material. Traditional exhaust systems may spray a diesel exhaust fluid (DEF) into the flow of exhaust to reduce emissions. New government regulations have continually reduced the amount of acceptable concentrations of byproducts dispelled from off-road vehicles, particularly in relation to NOx. Thus, additional DEF may be mixed with the exhaust to further reduce emissions. Therefore, the amount of DEF carried on a diesel off-road vehicle may also be increased. Unfortunately, certain off-road vehicles may not have sufficient internal space to accommodate larger DEF tanks.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a diesel exhaust fluid (DEF) tank for an off-road vehicle includes a first conduit channel molded into an exterior surface of the DEF tank, at a first depth, in which the first conduit channel is configured to guide a first conduit along the exterior surface of the DEF tank. The DEF tank further includes a second conduit channel molded into the exterior surface of the DEF tank at a second depth, different than the first depth, in which the second conduit channel is configured to guide a second conduit, and the first depth and the second depth are selected to create a vertical gap between the first conduit and the second conduit at an intersection of the conduits.

In a second embodiment, a diesel exhaust fluid (DEF) tank for an off-road vehicle includes a drain channel molded into an exterior surface of the DEF tank, in which the drain channel is configured to provide structural support to the DEF tank and to enable DEF to flow downwardly through the drain channel. The DEF tank further includes a sloped wall molded into the exterior surface of the DEF tank, in which the sloped wall is configured to capture and funnel the DEF into the drain channel.

In a third embodiment, a diesel exhaust fluid (DEF) tank for an off-road vehicle includes a retaining bar configured to support the DEF tank, a channel molded into a side of the DEF tank, in which the channel is configured to interface with the retaining rod; and a cutout formed within the channel, in which the cutout establishes a gap between the retaining bar and a body of the DEF tank. The DEF tank further includes a drain channel molded into an exterior surface of the DEF tank, in which the drain channel is configured to provide structural support to the DEF tank, and the gap is configured to enable DEF flow downwardly into the drain channel without contacting the retaining bar.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
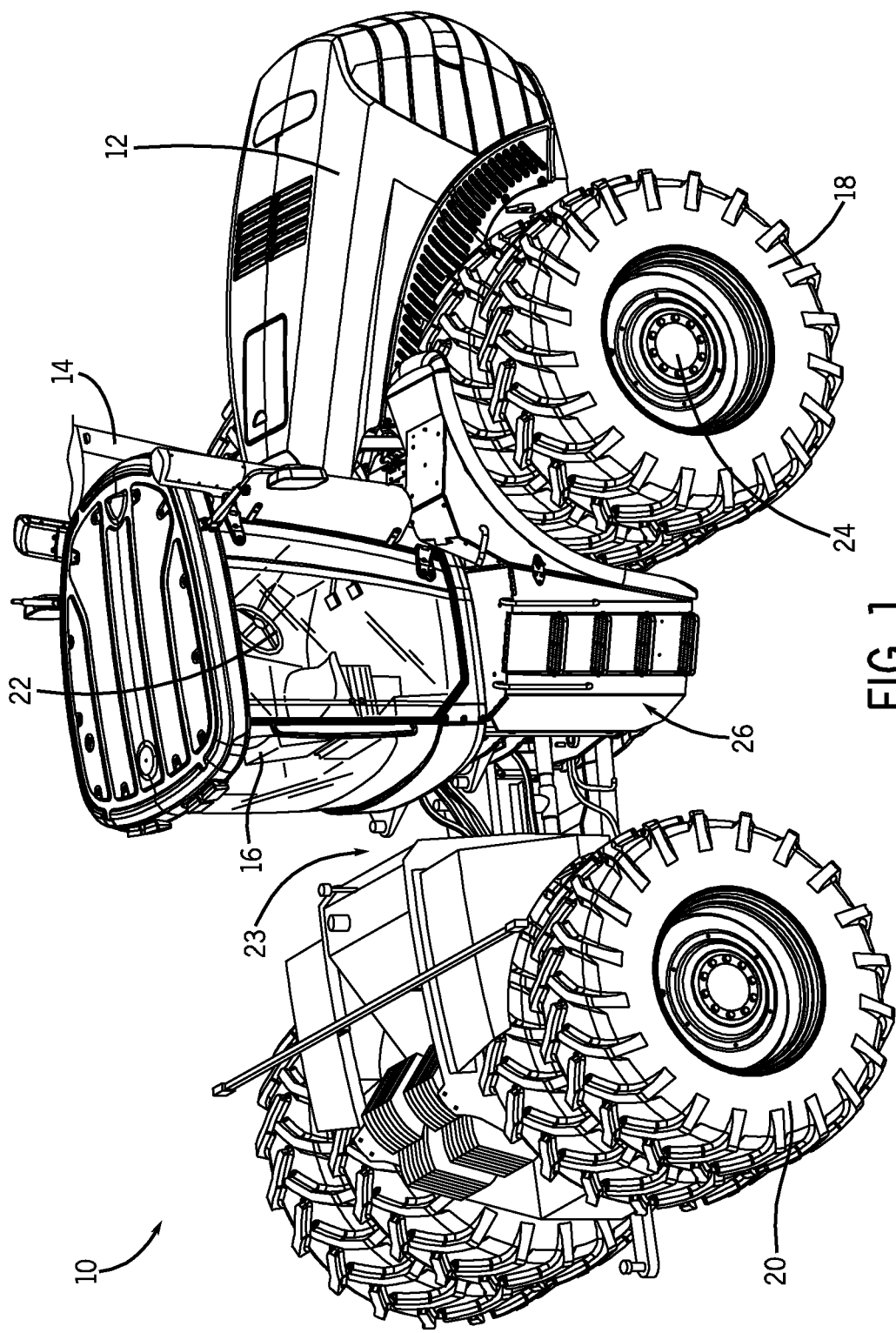
FIG. 1 is a perspective view of an embodiment of an off-road work vehicle that employs an exhaust system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Various embodiments of the present disclosure include an exhaust system for a diesel engine of an off-road vehicle. As regulations regarding exhaust continue to become more stringent regarding the concentration of expelled byproducts (e.g., nitrogen oxides), the amount of diesel exhaust fluid (DEF) used by the off-road vehicle may increase. To account for the additional DEF, larger DEF tanks may be added to existing off-road vehicles. In certain embodiments, the tank size may increase significantly (e.g. from 160 L to 230 L). However, the structure surrounding the tank may not be able to accommodate the larger tank. For example, a DEF bundle and electrical conduits be routed above and around the tank; however, a larger DEF tank, may interfere with passage of these conduits. In other words, there is less room for the DEF bundle and the electrical conduits to pass above and around the tank. Thus, rubbing and/or chaffing may occur between the DEF bundle and the electrical conduits. Other structures may also limit the size of the tank, such as a supply module, an electrical distribution center, and an access door.

In addition, with a larger DEF tank, more structural support may be beneficial. Certain DEF tanks are manufactured from a single piece of polyethylene. Accordingly, with the increase in tank size, the DEF tank may be more susceptible to deformation during both assembly of the off-road vehicle and while filling the DEF tank with DEF. Furthermore, DEF may interfere with other structures of the off-road vehicle. With less open space around the DEF tank, it may be more difficult to properly drain leaking fluid.

Accordingly, one embodiment provides a diesel exhaust fluid (DEF) tank for an off-road vehicle including a first conduit channel molded into an exterior surface of the DEF tank, at a first depth, in which the first conduit channel is configured to guide a first conduit along the exterior surface of the DEF tank. The DEF tank further includes a second conduit channel molded into the exterior surface of the DEF tank at a second depth, different than the first depth, in which the second conduit channel is configured to guide a second conduit, and the first depth and the second depth are selected to create a vertical gap between the first conduit and the second conduit at an intersection of the conduits.

Another embodiment provides a diesel exhaust fluid (DEF) tank for an off-road vehicle including a drain channel molded into an exterior surface of the DEF tank, in which the drain channel is configured to provide structural support to the DEF tank and to enable DEF to flow downwardly through the drain channel. The DEF tank further includes a sloped wall molded into the exterior surface of the DEF tank, in which the sloped wall is configured to capture and funnel the DEF into the drain channel. Accordingly, the drain channels serve a dual purpose of providing structural rigidity to the DEF tank and enabling leaking and/or spilled DEF to flow toward the ground.

With the forgoing in mind, it may be useful to describe a DEF tank incorporating the techniques disclosed herein. Accordingly, FIG. 1 is a perspective view of an embodiment of an agricultural work vehicle 10 that employs an exhaust system for a diesel engine. In certain embodiments, the agricultural work vehicle 10 may be a tractor, off-road vehicle, work vehicle, or any other suitable vehicle that may incorporate an exhaust system for a diesel engine. The illustrated vehicle 10 has a body 12 that houses an engine, transmission, cooling system, and power train (not separately shown). The body 12 also houses a portion of an exhaust system 14. Further, the agricultural work vehicle 10 has a cabin 16 where an operator may sit or stand to operate the vehicle 10. The vehicle 10 has four front wheels 18 and four rear wheels 20 that rotate to move the vehicle 10. Alternatively, the vehicle 10 may have two or six front wheels 18 and rear wheels 20. In addition, the vehicle 10 may be a two track or a four track vehicle 10. As will be appreciated, the vehicle 10 is maneuvered using a steering wheel 22 that induces the vehicle to bend about a pivot joint 23. As illustrated, the wheels 18 are coupled to an axle 24 (e.g., fixed or suspended) that supports the wheels 18, and facilitates wheel rotation. As discussed in detail below, the exhaust system 14 may be routed around various systems within the body 12, such as a DEF tank 26 located behind an access door.

Figure 2:
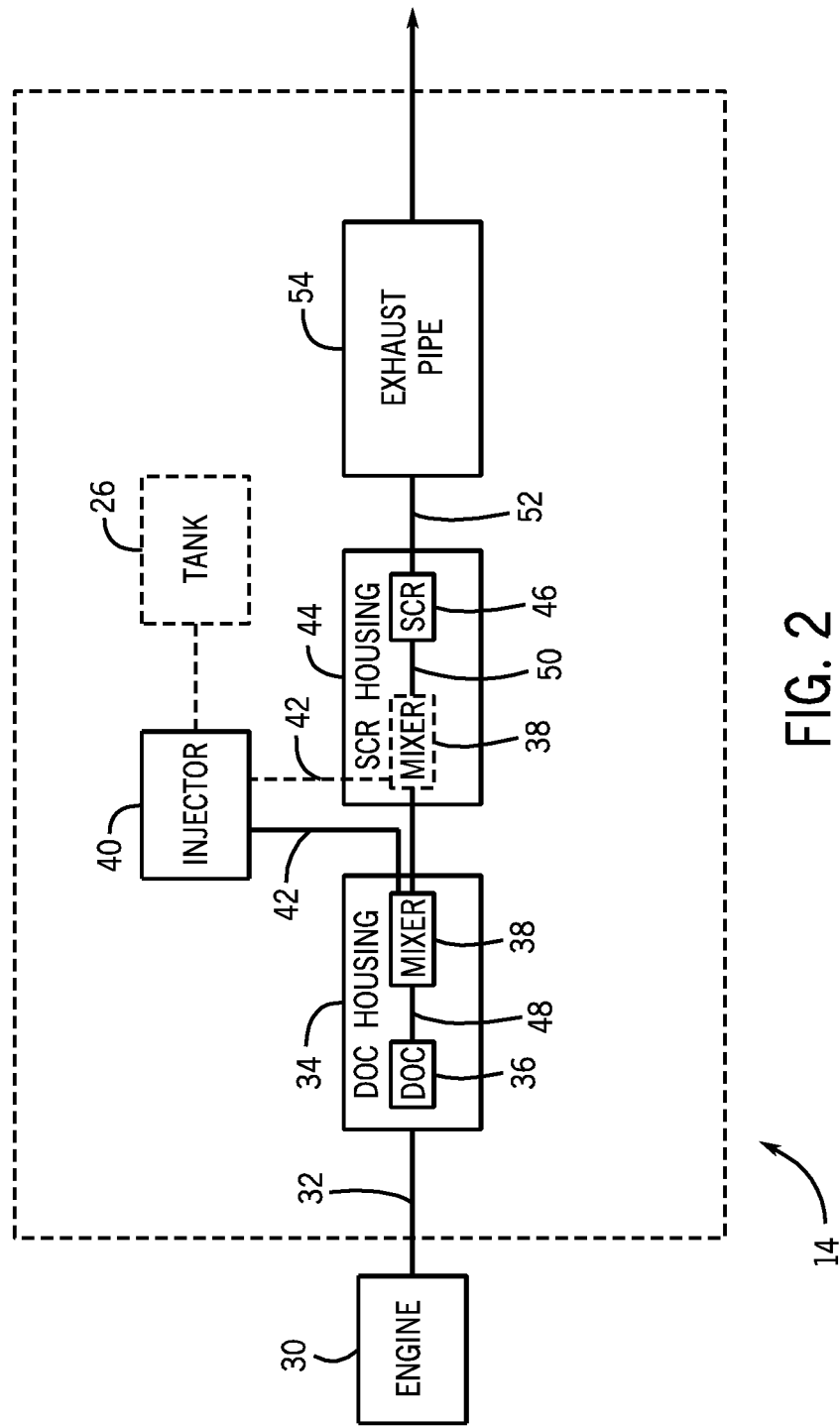
FIG. 2 is a schematic diagram of an embodiment of an exhaust system that may be used within the off-road work vehicle of FIG. 1.

FIG. 2 is a schematic diagram of an embodiment of an exhaust system 14 that may be used within the off-road work vehicle of FIG. 1. In the illustrated embodiment, an engine 30 expels exhaust 32 to the exhaust system 14. The illustrated embodiment of the exhaust system 14 includes a diesel oxidation catalyst (DOC) assembly having a housing 34 containing a DOC 36 and a mixer 38. The exhaust system 14 also includes an injector 40 for injecting diesel exhaust fluid (DEF) 42, a selective catalytic reduction (SCR) housing 44 containing an SCR module 46, and an exhaust pipe 54. In some embodiments, the mixer 38 may be disposed within the SCR housing 44 instead of, or in addition to, the DOC housing 34. Certain embodiments of the exhaust system 14 may additionally include a diesel particulate filter to capture particulate matter, a muffler, or any other element suitable for use in an exhaust system.

The DOC housing 34 receives exhaust 32, and directs the exhaust 32 into the DOC 36. The DOC 36 receives the exhaust and catalyzes the oxidization of carbon monoxide to carbon dioxide by using excess oxygen in the exhaust 32. Similarly, the DOC 36 uses excess oxygen to catalyze the conversion of hydrocarbons to water and carbon dioxide. In certain embodiments, the DOC 36 may use ceramics, metals (e.g., platinum, palladium, etc.), or other suitable catalysts to catalyze the oxidization of the hydrocarbons and carbon monoxide molecules. Thus, the DOC 36 receives raw exhaust 32 and outputs catalyzed exhaust 48 with reduced concentrations of hydrocarbons and carbon monoxide. The DOC housing 34 directs the exhaust 48 to the mixer 38, which is enclosed within the DOC housing 34. The mixer 38 also receives the DEF 42 from the injector 40, in addition to the exhaust 48 from the DOC 36. In certain embodiments, the exhaust system 14 includes a DEF tank 26 for containing the DEF 42, and supplying the DEF to the injector 40. Alternatively, the injector 40 may include a DEF tank 26 containing DEF 42. In further embodiments, the DEF tank 26 containing the DEF 42 may be remote from the injector 40. In certain embodiments, the mixer 38 may be disposed within the SCR housing 44, a separate housing, or any other housing suitable for containing the mixer 38.

The injector 40 sprays the DEF 42 into the exhaust 48 within the mixer 38. The DEF 42 is a solution used to reduce NOx within the exhaust 48. For example, in certain embodiments, the DEF 42 may be an aqueous urea solution which undergoes thermal decomposition and hydrolysis within the exhaust system 14 to produce ammonia, which the SCR uses to convert the NOx into nitrogen and water. Thus, the mixer 38 supplies well-mixed exhaust solution 50 to the SCR module 46. The SCR module 46 receives the exhaust solution 50 and uses the distributed DEF 42 to reduce the NOx concentration in the exhaust gas. Finally, the SCR module 46 sends processed exhaust 52 with a reduced NOx concentration through the exhaust pipe 54 to be released into the atmosphere.

Figure 3:
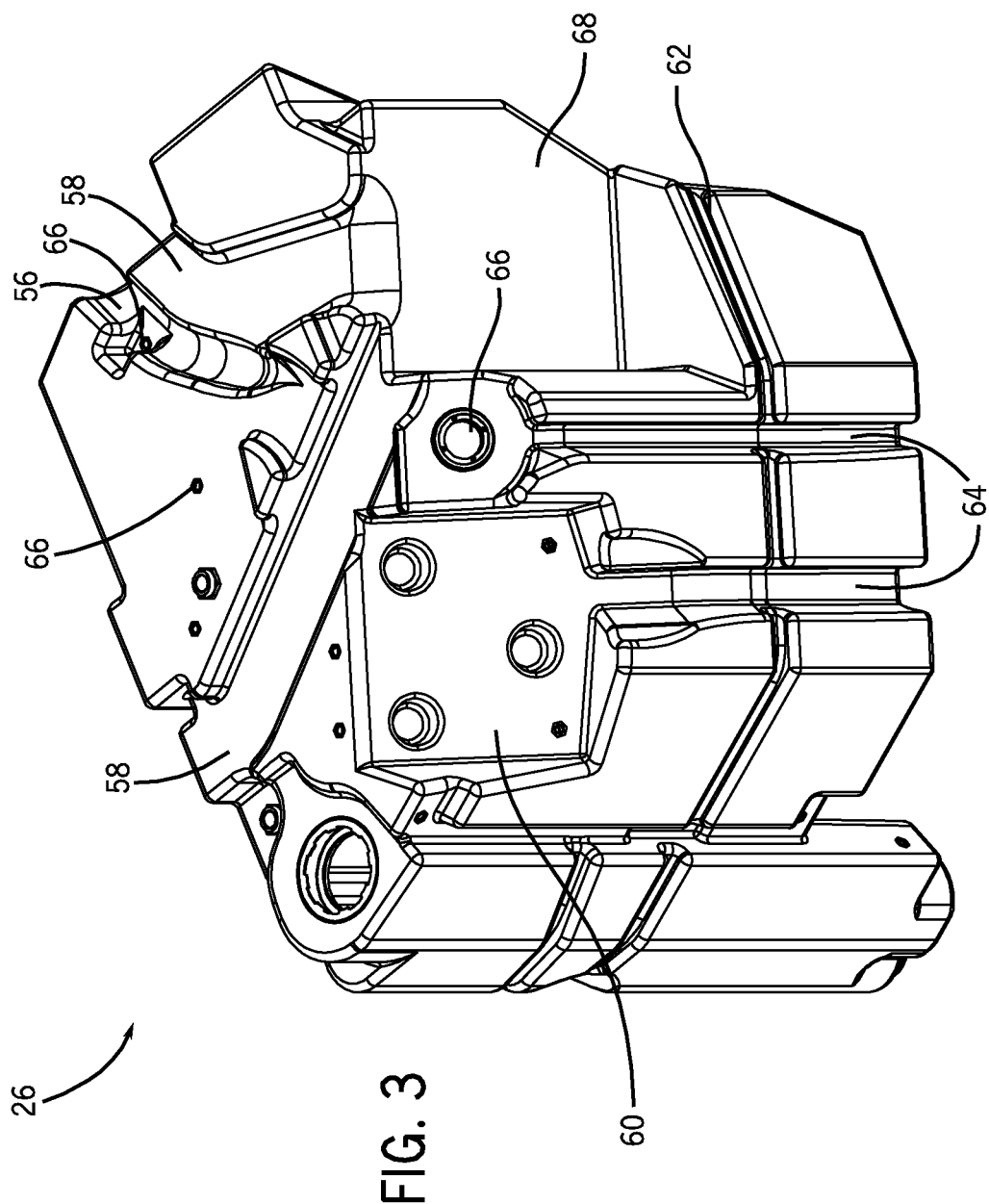
FIG. 3 is a perspective view of an embodiment of a DEF tank, showing a DEF bundle channel, electrical conduit channels, a supply module recess, a channel for a retaining bar, drain channels, metal inserts, and an electrical distribution center recess.

FIG. 3 is a perspective view of an embodiment of a DEF tank, showing a DEF bundle channel 56, electrical conduit channels 58, a supply module recess 60, a channel for a retaining bar 62, drains channels 64, metal inserts 66, and an electrical distribution center recess 68. The DEF tank 26 may be molded from a single piece of polyethylene. However, it should be appreciated that the DEF tank 26 may be molded from other types of thermoplastics such as polypropylene, polystyrene, polyvinyl chloride, or polytetrafluoroethylene in alternative embodiments. In the illustrated embodiment, features such as, the DEF bundle channel 56, electrical conduit channels 58, the supply module recess 60, the channel 62 for the retaining bar, the drain channels 64, and the metal inserts 66 may be molded into the DEF tank 26 during the manufacturing process.

The DEF bundle channel 56 is configured to guide a DEF bundle. Thus, as illustrated, a first conduit channel (e.g., DEF bundle channel 56) is molded into the exterior surface of the DEF tank 26 to enable the first conduit channel (e.g., DEF bundle channel 56) to guide a first conduit (e.g., DEF bundle) along the exterior surface of the DEF tank 26. Similarly, the electrical conduit channels 58 are configured to guide electrical conduits. Thus, as illustrated, a second conduit channel (e.g., electrical conduit channel 58) is molded into the exterior surface of the DEF tank 26 to enable the (e.g., electrical conduit channel 58) to guide a second conduit (e.g., electrical conduit) along the exterior surface of the DEF tank 26. However, as depicted, the DEF bundle channel 56 and the electrical conduit channel 58 intersect. In other words, the first conduit channel (e.g., DEF bundle channel 56) and the second conduit channel (e.g., electrical conduit channel 58) are molded into the exterior surface of the DEF tank 26 such that they intersect. However, as will be described in more detail below, the depths of the conduit channels are selected to create a vertical gap between the first conduit (e.g., DEF bundle) and the second conduit (e.g., electrical conduit) at a point where the conduits would otherwise intersect. Accordingly, the possibility of contact between the conduits is substantially reduced or eliminated, thereby reducing wear on the conduits.

The supply module recess 60 is configured to receive a DEF supply module. The channel 62 is configured to interface with a retaining rod. The drain channels 64 are configured to provide structural support to the DEF tank and to enable DEF to flow downwardly through the drain channels without contacting the retaining bar. The metal inserts 66 may be threaded and configured to interface with a bolt or a cap. The electrical distribution center recess 68 is configured to receive an electrical distribution center.

Figure 4:
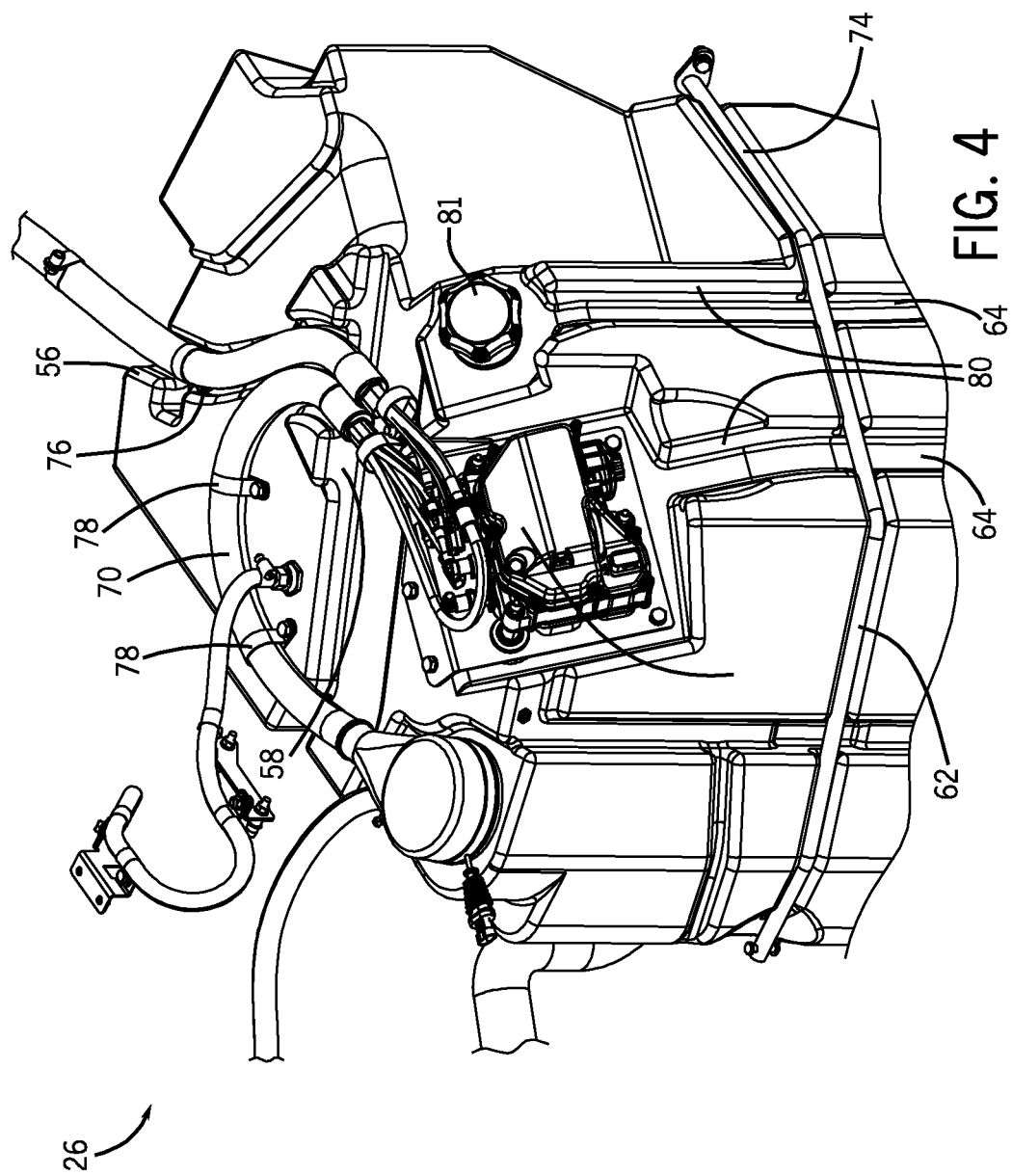
FIG. 4 is a perspective view of the DEF tank of FIG. 3, showing a DEF bundle, a supply module, and a retaining bar.

FIG. 4 is a perspective view of the DEF tank of FIG. 3, showing the DEF bundle 70, a supply module 72, a retaining bar 74, and drain channels 64. As illustrated, the DEF bundle 70 is guided by the DEF bundle channel 56. In the illustrated embodiment, the DEF bundle channel 56 includes a curve 76. Thus, because the DEF bundle channel 56 is curved, the DEF bundle 70 guided by the channel is also curved. The curve 76 in the DEF bundle channel 56 may be used to guide the DEF bundle 70 around other structures, such as an electrical conduit. Furthermore, the curve 76 in the DEF bundle channel 56 may accommodate a maximum desired curvature of the DEF bundle 70, thereby reducing strain on the DEF bundle 70. In addition, as illustrated, the DEF bundle 70 is secured to the DEF tank 26 with clamps, such as the illustrated p-clamps 78. It may be observed that a DEF bundle 70 having a tighter bend may utilize more p-clamps 78. On the other hand, when the bend is more gradual, fewer p-clamps 78 may be used. Thus, a more gradual curve 76 may also reduce the part count. It should be appreciated that the DEF bundle channel 56 may be formed into any shape suitable for molding polyethylene. In addition, the illustrated DEF bundle 70 interfaces with both the supply module 72 and the DEF tank 26.

As can be seen in the depicted embodiment, the DEF bundle 70 passes over one of the electrical conduit channels 58. As will be described in more detail in FIG. 7, an electrical conduit may pass under the DEF bundle 70 without rubbing and/or chaffing, thereby reducing wear on the conduits.

The retaining bar 74 is configured to support the DEF tank 26. It should be appreciated that the retaining bar may be formed from any suitable material, such as stainless steel, that is capable of holding the DEF tank 26 in place and supporting the weight of the DEF tank 26 and the DEF. In the depicted embodiment, the retaining bar 74 extends partially around the DEF tank 26, and includes mounts for securing the tank to other structures of the off-road vehicle 10. In addition, the retaining bar 74 interfaces with the channel 62 molded into the DEF tank 26. In the depicted embodiment, the channel 62 partially surrounds the retaining bar 74, thereby enabling the retaining bar to support the DEF tank 26 in both vertical and horizontal directions.

The drain channels 64 are configured to enable DEF to flow downwardly through the drain channels 64. In the illustrated embodiment, the drain channels 64 are substantially vertical and located in areas of the DEF tank 26 that may receive spilled and/or leaked DEF (e.g. under the supply module 72 and under the neck filler 81). Once DEF enters the drain channels 64, gravity pulls the fluid downwardly toward the ground. Furthermore, the drain channels 64 are recessed into the DEF tank 26, as shown, which may reduce the possibility of contact between DEF and other structures in the vehicle 10. In addition, in the depicted embodiment, the channel 62 crosses the drain channels 64 at multiple locations. The retaining bar is spaced from the base of the channels 64, thereby reducing the possibility of contact between the DEF and the retaining bar.

In addition, the drain channels 64 are configured to provide additional structural support to the DEF tank 26. As described above, the DEF tank 26 may hold a significant amount of DEF (e.g. 230 L) and may be made out of polyethylene, which is resilient. Accordingly, walls 80 of the drain channels 64 support the tank without substantially increasing weight. For example, in the depicted embodiment, the drain channel walls 80 are substantially perpendicular to the exterior surface of the DEF tank 26. As a result, the structural rigidity of the tank may be enhanced. Working in conjunction with the retaining bar 74, the drain channel walls 80 may reduce the horizontal deformation, which may otherwise be induced by the weight of the DEF.

Figure 5:
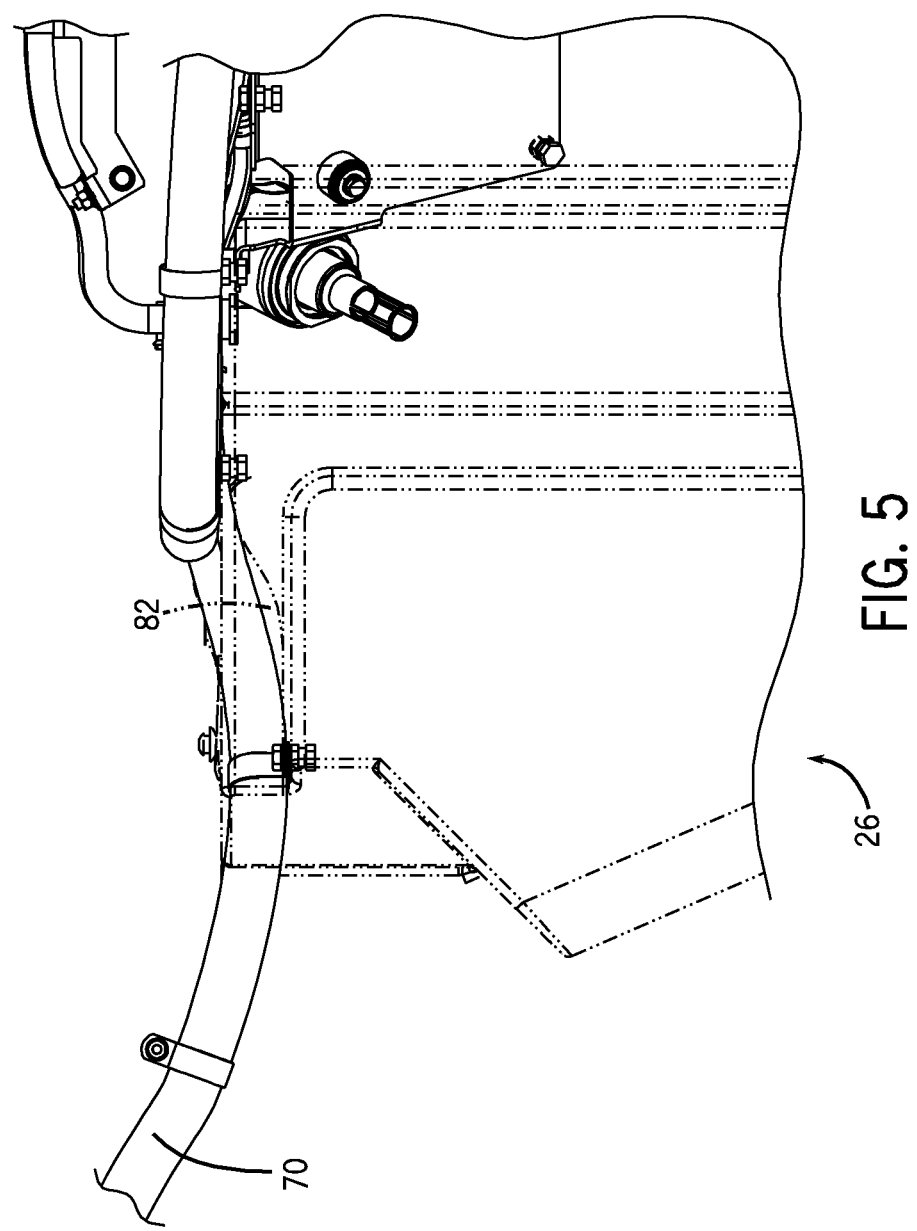
FIG. 5 is a cross-sectional view of the DEF tank of FIG. 3, showing the routing of a DEF bundle.

FIG. 5 is a cross-sectional view of the DEF tank of FIG. 3, showing the routing of a DEF bundle 70. In the depicted embodiment, the DEF bundle channel 56 includes a sloped portion 82. Similar to the curve 76 in FIG. 4, the sloped portion 82 guides the DEF bundle 70 around other structures such as an electrical conduit. As illustrated, the DEF bundle channel 56 and the corresponding DEF bundle 70 may be recessed into an exterior surface of the DEF tank 26. Again, it may be beneficial to limit the slope of the DEF bundle channel 56 to reduce strain on the DEF bundle 70.

Figure 6:
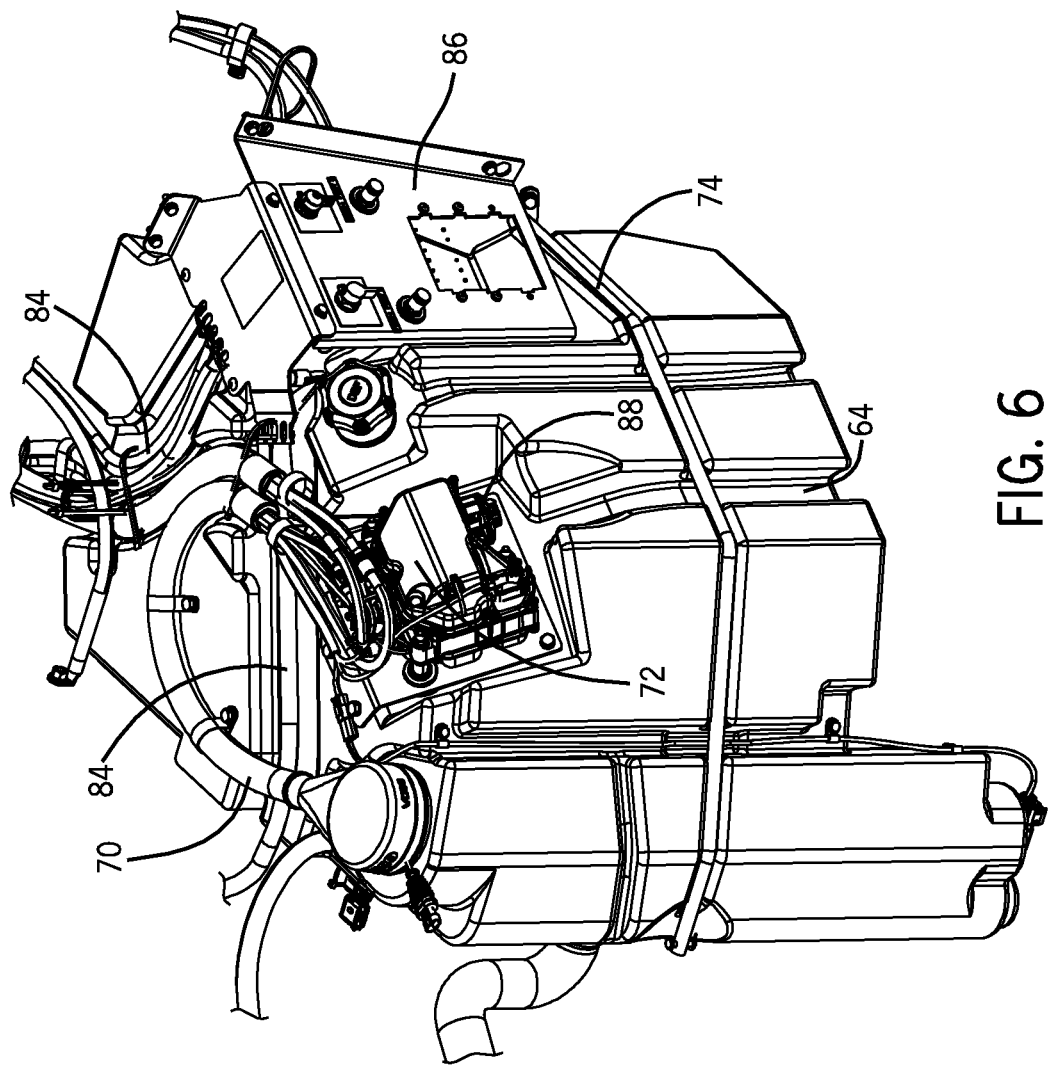
FIG. 6 is a perspective view of the DEF tank of FIG. 3, showing a DEF bundle, electrical conduits, a supply module, an electrical distribution center, and a retaining bar.

FIG. 6 is a perspective view of the DEF tank of FIG. 3, showing the DEF bundle 70, electrical conduits 84, the supply module 72, an electrical distribution center 86, and the retaining bar 74. As shown, the supply module 72 is mounted within the supply module recess 60, and the electrical distribution center 86 is mounted within the electrical distribution recess 68. The DEF tank 26 may utilize the supply module recess 60 and the electrical distribution recess 68 reduce the protrusion of the supply module 72 and the electrical distribution center 86 from the DEF tank 26, which may provide a more efficient use of the limited space within the vehicle 10. Thus, the size of the DEF tank 26 may be increased without contacting other structures within the vehicle 10.

In the depicted embodiment, the electrical distribution center 86 is connected to the electrical conduits 84. The electrical conduits facilitate communication between the electrical distribution center and other parts of the vehicle 10. Furthermore, the supply module 72 includes a filter 88, which may be removable from the supply module 72. In the depicted embodiment, the filter 88 is not blocked by any portion of the tank structure, and may be removed while the supply module 72 is mounted to the DEF tank 26.

As described above, the DEF bundle 70 and the electrical conduits 84 cross one another without rubbing and/or chaffing because a vertical gap is formed between them. It should be appreciated that the electrical conduit channels 58 may include any of the features (e.g. the curve 76 and the slope 82) described above in relation to the DEF bundle channel 56.

Figure 7:
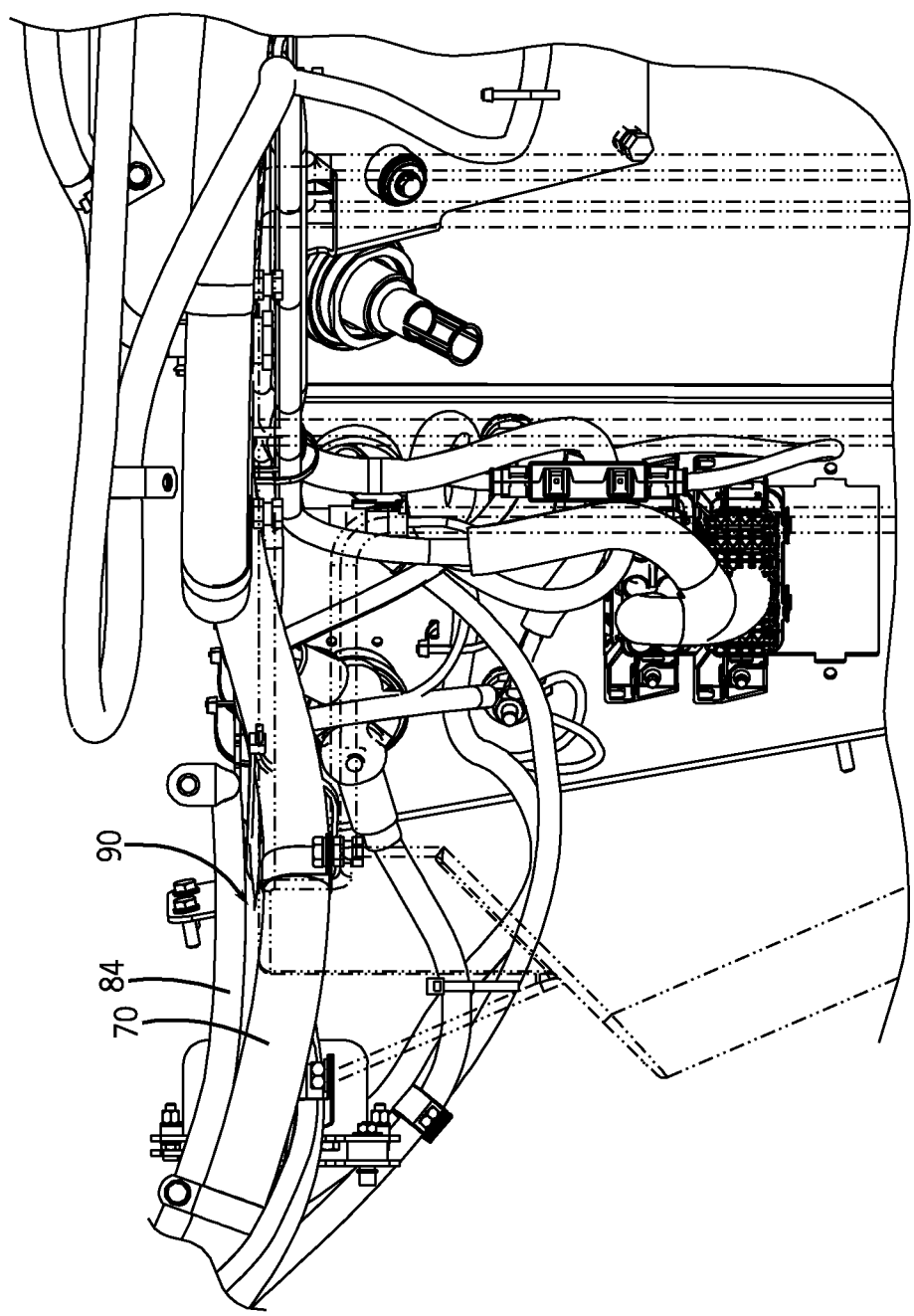
FIG. 7 is a cross-sectional view of the DEF tank of FIG. 3, showing a gap between a DEF bundle and electrical conduits.

FIG. 7 is a cross-sectional view of the DEF tank 26 of FIG. 3, showing a gap 90 between a DEF bundle 70 and an electrical conduit 84. As described above, a first conduit channel (e.g., DEF bundle channel 56) may guide a first conduit (e.g., DEF bundle 70) along the exterior surface of the DEF tank 26, and a second conduit channel (e.g., electrical conduit channel 58) may guide a second conduit (e.g., electrical conduit 84) along the exterior surface of the DEF tank 26. Because the first conduit channel (e.g., DEF bundle channel 56) and the second conduit channel intersect (e.g., electrical conduit channel 58), as depicted, the first conduit channel (e.g., DEF bundle channel 56) is molded into the exterior surface of the DEF tank 26 at a first depth and the second conduit channel (e.g., electrical conduit channel 58) is molded into the exterior surface of the DEF tank 26 at a second depth to create a gap 90 at a point where the first conduit (e.g., DEF bundle channel 56) and the second conduit (e.g., electrical conduit 84) would otherwise intersect, thereby reducing the likelihood of the first conduit (e.g., DEF bundle channel 56) and the second conduit (e.g., electrical conduit 84) coming into contact with one another. In addition, the DEF bundle 70 and the electrical conduit 84 may be guided by the DEF bundle channel 56 and the electrical conduit channels 58 respectively, to avoid other structures in the vehicle, such as the access door shown in FIG. 8.

Figure 8:
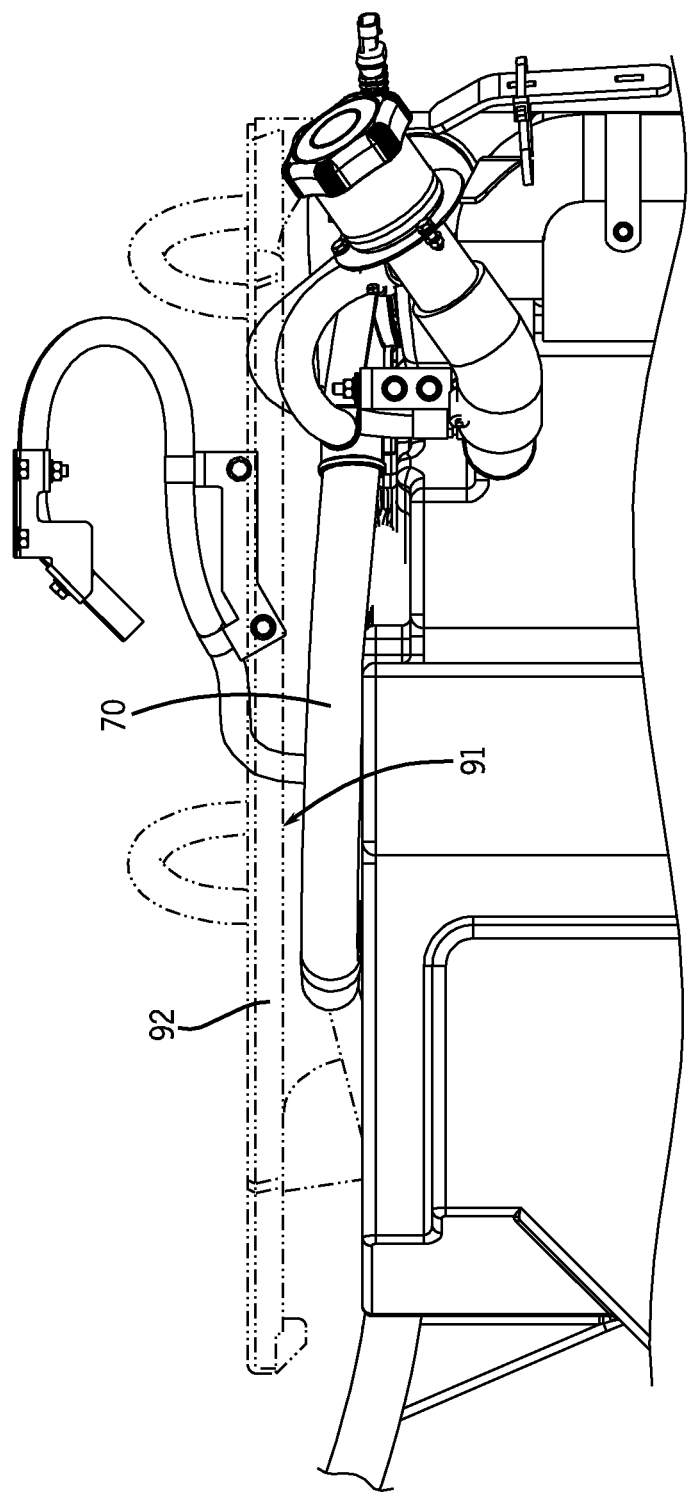
FIG. 8 is a side view of the DEF tank of FIG. 3, showing a gap between an access door and a DEF bundle.

FIG. 8 is a side view of the DEF tank of FIG. 3, showing a gap 91 between an access door 92 and the DEF bundle 70. Utilizing the techniques herein, the DEF bundle channel 56, the electrical conduit channels 58, the supply module recess 60 and the electrical distribution recess 68 are configured to create the gap 91 between respective structure on the tank and other structures in the vehicle 10, such as surrounding electrical components.

Figure 9:
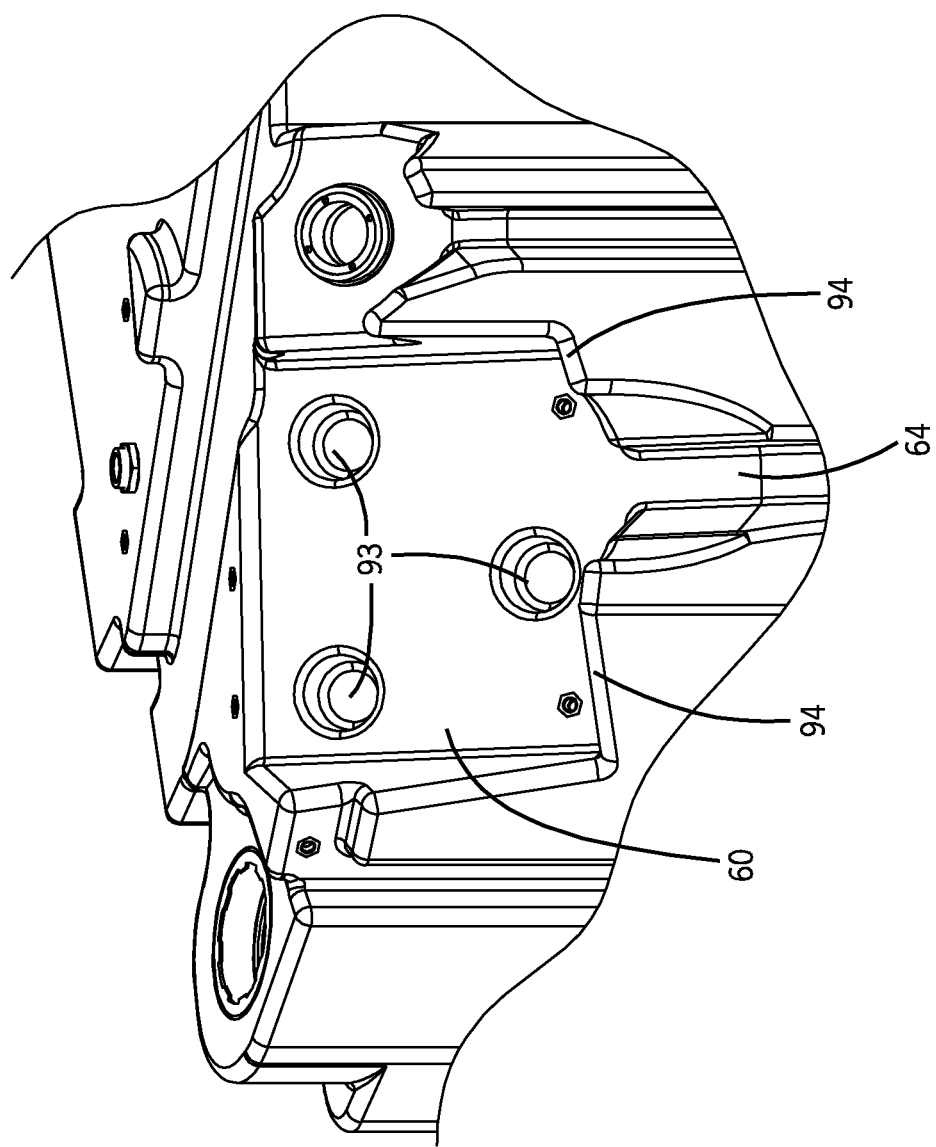
FIG. 9 is a side view of the DEF tank of FIG. 3, showing a supply module recess, isolation mount recesses, sloped walls, and a drain channel.

FIG. 9 is a side view of the DEF tank 26 of FIG. 3, showing the supply module recess 60, isolation mount recesses 93, sloped walls 94, and a drain channel 64. As described above, the supply module recess 60 is configured to receive the supply module 72. As depicted, the supply module recess 93 may include one or more isolation mount recesses 93. The isolation mount recesses 93 are recessed into the exterior surface of the DEF tank 26 and are configured to interface with one or more isolation mounts on the supply module. In the illustrated embodiment, three isolation mounts are attached to the back of the supply module 72. These mounts interface with the three isolation mount recesses 93 in the DEF tank 26. The isolation mounts are configured to isolate the supply module 72 from the DEF tank 26. Accordingly, the isolation mounts may be made out of a resilient substance, such as rubber.

As described above, the drain channel 64 may be located in areas of the tank that may receive spilled and/or leaked DEF, such as under the supply module 72. The drain channel 64 is configured to guide DEF downwardly through the drain channel 64. To direct fluid into the drain channel 64, sloped walls 94 are molded into the exterior surface of the DEF tank 26, and are configured to capture and funnel the DEF into the drain channels 64. As illustrated, the sloped walls 94 extend to the drain channel 64 and slope inwardly toward the drain channel 64.

Figure 10:
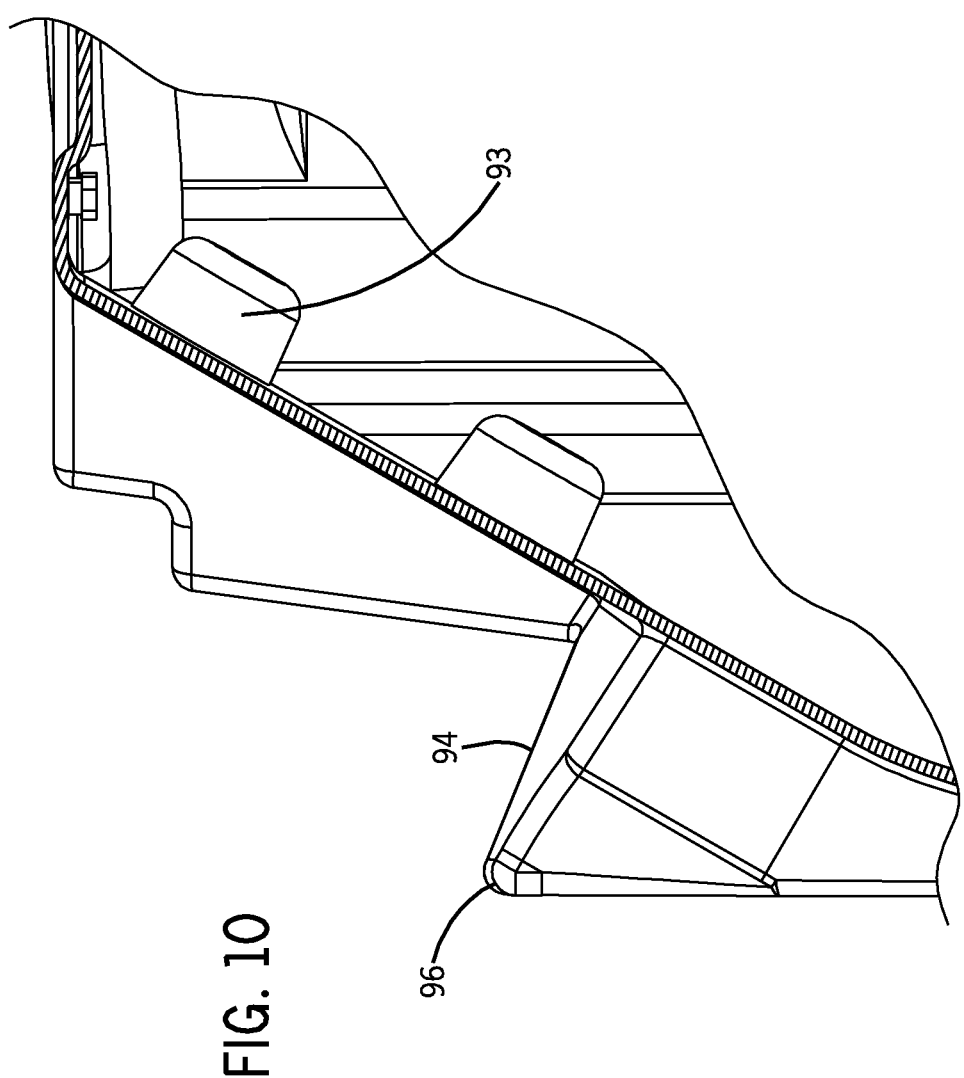
FIG. 10 is a cross-sectional view of the DEF tank of FIG. 3, showing the sloped walls.

FIG. 10 is a cross-sectional view of the DEF tank 26 of FIG. 3, showing the sloped walls 94 and the isolation mount recesses 93. As shown, the sloped walls 94 are angled upwardly. In addition to being sloped inwardly toward the drain channel 64, the sloped walls 94 may also be angled upwardly to increase the amount of DEF funneled into the drain channel 64. For example, in the depicted embodiment, the sloped walls 94 may reduce the possibility of the DEF flowing over the edge 96 of the sloped wall 94 and away from the drain channel 64. The illustrated cross-sectional view also shows the isolation mount recesses 93 recessed into the DEF tank 26.

Figure 11:
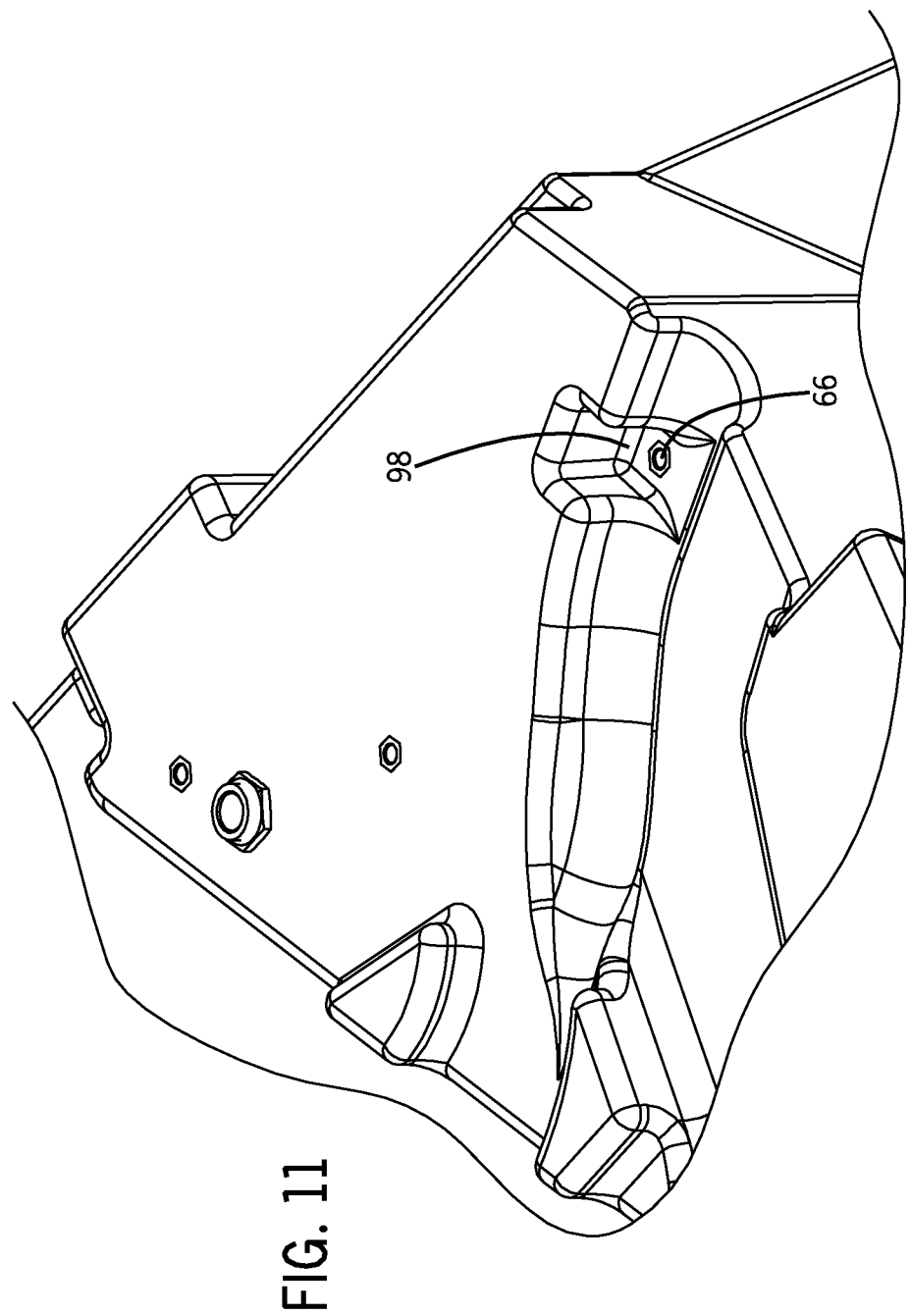
FIG. 11 is a perspective view of the DEF tank of FIG. 3, showing a metal insert and a recess for a clamp.

FIG. 11 is a perspective view of the DEF tank 26 of FIG. 3, showing a metal insert 66 and a clamp recess 98. As described above, the metal insert 66 may be molded into the DEF tank 26. For example, the metal insert 66 may be flush or slightly above the surface of the DEF tank 26. In the illustrated embodiment, the metal insert 66 is threaded and configured to interface with a bolt. Working in conjunction with the clamp recess 98, a p-clamp 78, such as the ones shown in FIG. 4, may be used to secure a conduit, such as the DEF bundle 70 to the tank 26. For example, in the depicted embodiment, the p-clamp 78 fits into the clamp recess 98 and is secured to the tank by a bolt that engages the metal insert 66. Accordingly, the p-clamp secures the DEF bundle 70 to the tank.

Figure 12:
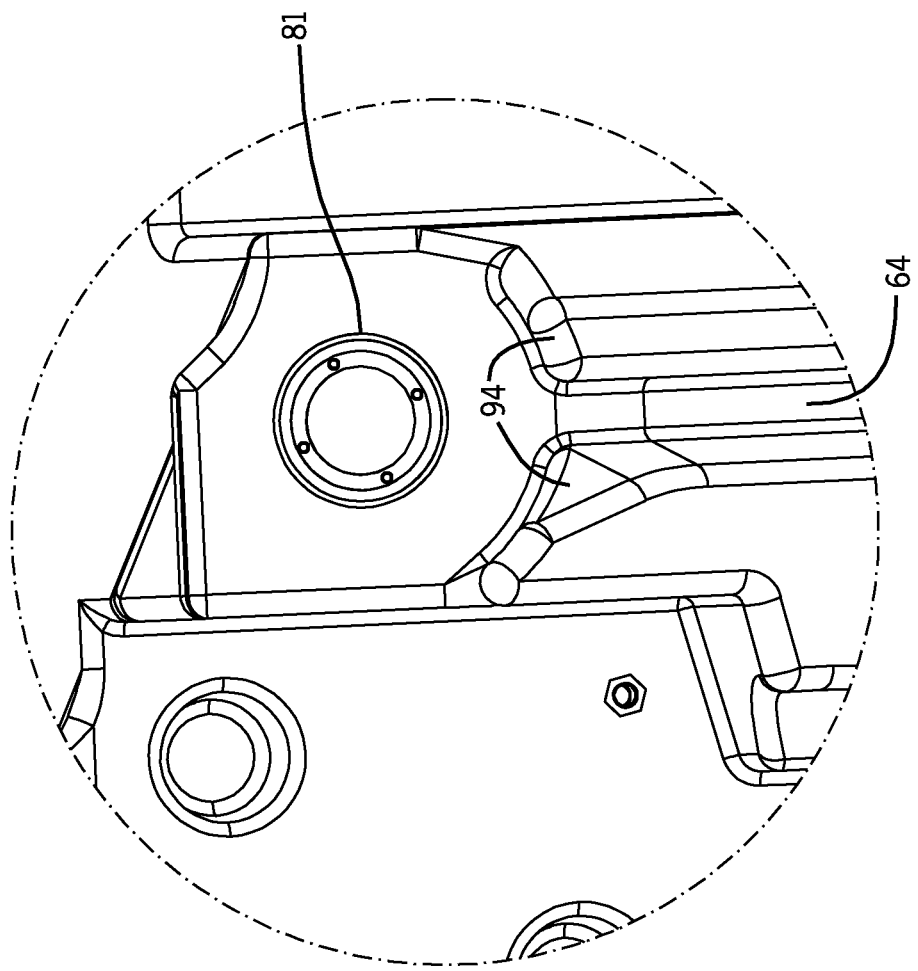
FIG. 12 is a side view of the DEF tank of FIG. 3, showing a neck filler, sloped walls, and a drain channel.

FIG. 12 is a side view of the DEF tank 26 of FIG. 3, showing the neck filler 81, sloped walls 94, and the drain channel 64. In the depicted embodiment, the neck filler 81 includes a metal insert 66 molded into an exterior surface of the DEF tank 26. The neck filler 81 is configured to enable an operator to fill the DEF tank 26 with DEF. As described above, sloped walls 94 and the drain channel 64 are located under the neck filler 81 to capture, funnel, and guide DEF downwardly to the ground. As will be appreciated, the neck filler 81 is configured to interface with a cap to substantially seal the DEF within the tank. As previously discussed, the drain channels 64 may cross the channel 62 and the retaining bar 74.

Figure 13:
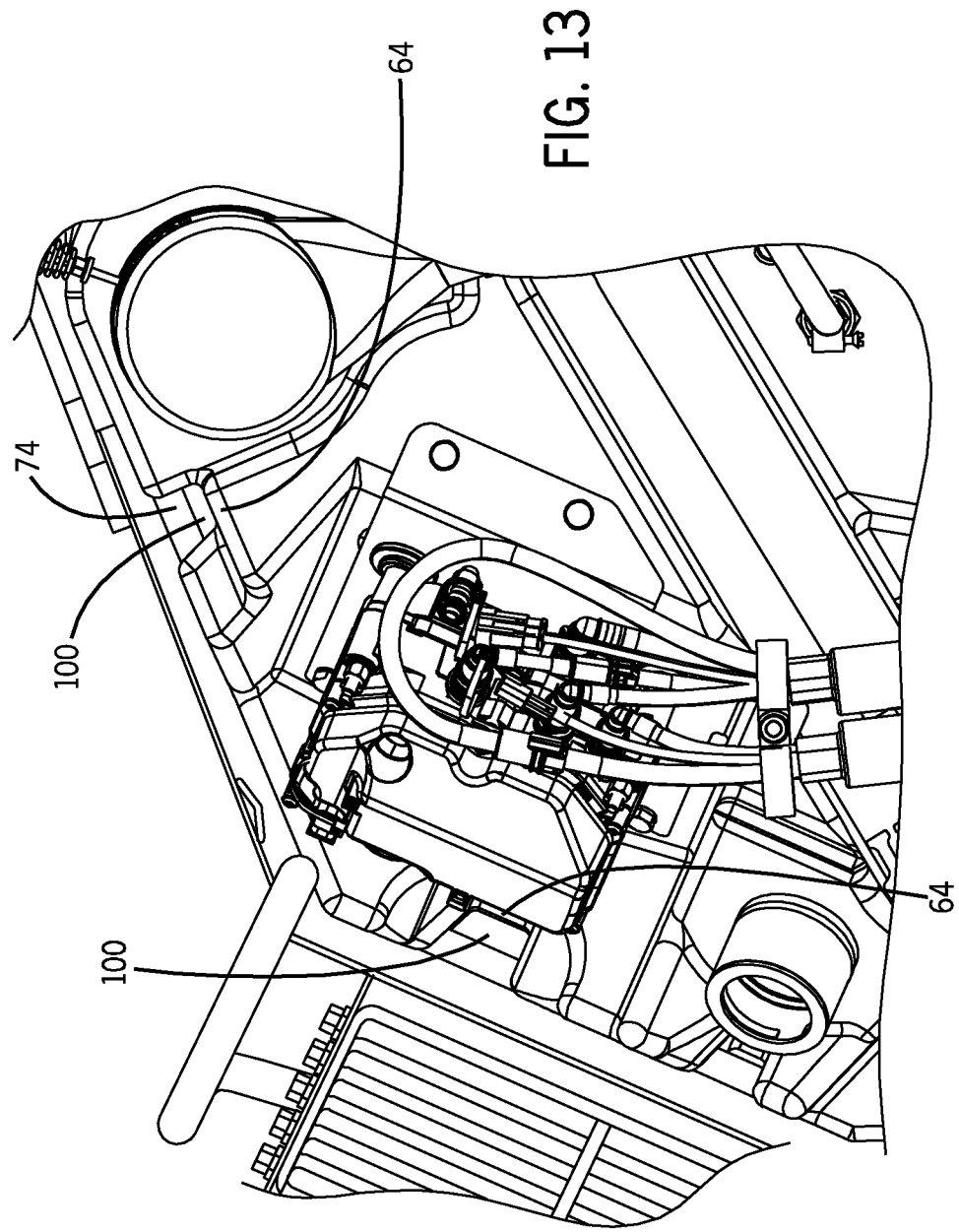
FIG. 13 is a top view of the DEF tank of FIG. 3, showing gaps between a retaining bar and a body of the DEF tank.

FIG. 13 is a top view of the DEF tank 26 of FIG. 3, showing drain channels 64 that reduce the possibility of the DEF contacting the retaining bar 74. In the depicted embodiment, the DEF tank 26 includes a cutout formed within the retaining bar channel 62, in which the cutout establishes a gap 100 between the retaining bar 74 and a body of the DEF tank 26. Thus, the gap 100 is configured to enable DEF flow downwardly into the drain channel without contacting the retaining bar 74.

Figure 14:
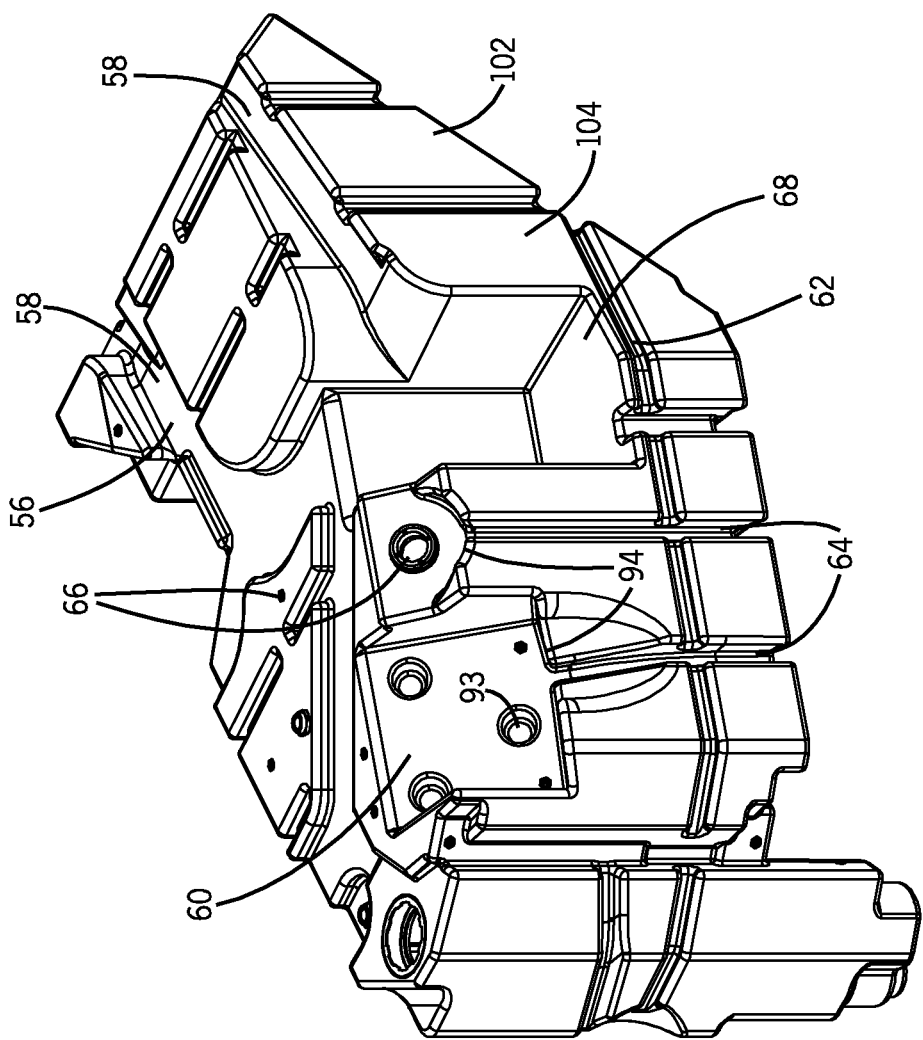
FIG. 14 is a perspective view of an alternate embodiment of a DEF tank.

FIG. 14 is a perspective view of an alternate embodiment of a DEF tank 26. The alternate embodiment of the DEF tank 26 includes the DEF bundle channel 56, the electrical conduit channels 58, the supply module recess 60, the channel 62, the drain channels 64, the metal inserts 66, the electrical distribution center recess 68, isolation mount recesses 93, and sloped walls 94. As mentioned before, the electrical conduit channels include a sloped portion 102. In addition, in this embodiment, the electrical conduit channels 58 includes a large radius curve 104 that limits bending of the electrical conduit 84 as it interfaces with a fuse, a relay, and/or a switch, which may reduce the strain on the electrical conduit 84. Although the embodiment of the DEF tank 26 has many of the same features as the DEF tank 26 depicted in FIG. 3, the shape of the DEF tank 26 overall and the features may be different. Thus, the DEF tank 26 described herein may be adapted to fit any suitable off-road vehicle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A diesel exhaust fluid (DEF) tank configured to be used in an off-road vehicle, comprising:
   a first conduit channel molded into an exterior surface of the DEF tank at a first depth, wherein the first conduit channel is configured to guide a first conduit along the exterior surface of the DEF tank; and
   a second conduit channel molded into the exterior surface of the DEF tank at a second depth, wherein the second conduit channel intersects the first conduit channel, the second depth is different than the first depth, the second conduit channel is configured to guide a second conduit along the exterior surface of the DEF tank, and the first depth and the second depth are selected to create a first gap between the first conduit and the second conduit at a point where the first conduit and the second conduit would otherwise intersect.

2. The DEF tank of claim 1, wherein the first conduit comprises a DEF bundle configured to fluidly connect the DEF tank and a supply module, wherein the supply module is configured to be coupled to the exterior surface of the DEF tank.

3. The DEF tank of claim 1, wherein the second conduit comprises an electrical conduit configured to be electrically connected to an electrical device, wherein the electrical device is configured to be coupled to the exterior surface of the DEF tank.

4. The DEF tank of claim 1, comprising a metal insert molded into the DEF tank, wherein the metal insert is configured to facilitate coupling an auxiliary component to the DEF tank.

5. The DEF tank of claim 4, comprising a recess molded into the exterior surface of the DEF tank, wherein:
   the recess is configured to accept a clamp, wherein the clamp is configured to secure the first conduit within the first conduit channel; and
   the metal insert is threaded and configured to interface with a bolt, wherein the bolt is configured to secure the clamp to the exterior surface of the DEF tank within the recess.

6. The DEF tank of claim 1, wherein the first conduit channel is sloped.

7. The DEF tank of claim 6, wherein the first conduit channel is configured to direct the first conduit along a curved path along the exterior surface of the DEF tank.

8. The DEF tank of claim 1, wherein the first depth is selected to create a second gap between the first conduit and an access door positioned adjacent to the DEF tank, wherein the first conduit comprises a DEF bundle.

9. The DEF tank of claim 8, comprising an electrical distribution center recess molded into the exterior surface of the DEF tank at a third depth, wherein the electrical distribution center recess is configured to receive an electrical distribution center, and the third depth is selected to create a third gap between the electrical distribution center and the access door.

10. A diesel exhaust fluid (DEF) tank configured to be used in an off-road vehicle, comprising:
    a drain channel molded into an exterior surface of the DEF tank comprising an inlet and an outlet, wherein the drain channel is configured to:
        provide structural support to the DEF tank; and
        guide fluid present on the exterior surface of the DEF tank downwardly through the drain channel along the exterior surface of the DEF tank and through the outlet to a region below the DEF tank; and
    a sloped wall molded into the exterior surface of the DEF tank above the drain channel, wherein the sloped wall is configured to funnel the fluid present on the exterior surface of the DEF tank downwardly into the inlet of the drain channel.

11. The DEF tank of claim 10, comprising a DEF supply module recess molded into the exterior surface of the DEF tank, wherein:
    the DEF supply module recess is configured to receive a DEF supply module; and
    the sloped wall is configured to funnel the fluid from the DEF supply module recess into the drain channel.

12. The DEF tank of claim 11, wherein the DEF supply module recess comprises an isolation mount recess configured to accept an isolation mount of the DEF supply module.

13. The DEF tank of claim 10, comprising a metal insert molded into the DEF tank.

14. The DEF tank of claim 13, wherein the metal insert comprises a fill neck configured to enable the DEF tank to be filled with DEF, and the sloped wall is configured to funnel the fluid from a portion of the exterior surface of the DEF tank surrounding the fill neck into the drain channel.

15. The DEF tank of claim 10, wherein the drain channel is formed vertically along a side exterior surface of the DEF tank.

* * * * *